(12) United States Patent
Vera et al.

(10) Patent No.: US 9,170,947 B2
(45) Date of Patent: Oct. 27, 2015

(54) RECOVERING FROM DATA ERRORS USING IMPLICIT REDUNDANCY

(75) Inventors: Xavier Vera, Barcelona (ES); Matteo Monchiero, Barcelona (ES); Javier Carretero Casado, Barcelona (ES); Enric Herrero, Cardedeu (ES); Tanausu Ramirez, Barcelona (ES)

(73) Assignee: Intel Corporation, Santa Clara, CA (US)

( * ) Notice: Subject to any disclaimer, the term of this patent is extended or adjusted under 35 U.S.C. 154(b) by 160 days.

(21) Appl. No.: 13/992,732

(22) PCT Filed: Dec. 29, 2011

(86) PCT No.: PCT/US2011/067970
§ 371 (c)(1),
(2), (4) Date: Jun. 8, 2013

(87) PCT Pub. No.: WO2013/101123
PCT Pub. Date: Jul. 4, 2013

(65) Prior Publication Data
US 2014/0089593 A1   Mar. 27, 2014

(51) Int. Cl.
| | | |
|---|---|---|
| *G06F 13/00* | (2006.01) | |
| *G06F 12/08* | (2006.01) | |
| *G06F 11/00* | (2006.01) | |
| *G06F 11/08* | (2006.01) | |
| *G06F 11/16* | (2006.01) | |

(Continued)

(52) U.S. Cl.
CPC ............ *G06F 12/0822* (2013.01); *G06F 11/00* (2013.01); *G06F 11/08* (2013.01); *G06F 11/1666* (2013.01); *G06F 12/0806* (2013.01); *G06F 12/0815* (2013.01); *G06F 12/0817* (2013.01); *G06F 12/12* (2013.01); *G06F 11/20* (2013.01); *G06F 2212/1024* (2013.01); *G06F 2212/1028* (2013.01); *G06F 2212/1044* (2013.01); *Y02B 60/1225* (2013.01)

(58) Field of Classification Search
CPC ............ G06F 12/0806; G06F 12/0815; G06F 12/0817; G06F 11/00
USPC ................. 711/145, 144, 143, 141, 119, 147; 714/2
See application file for complete search history.

(56) References Cited

U.S. PATENT DOCUMENTS

| | | | | |
|---|---|---|---|---|
| 5,752,258 | A | * | 5/1998 | Guzovskiy et al. ........... 711/120 |
| 6,014,756 | A | | 1/2000 | Dottling et al. |
| 6,199,147 | B1 | * | 3/2001 | Smith et al. ................... 711/156 |

(Continued)

OTHER PUBLICATIONS

PCT International Search Report for PCT Counterpart Application No. PCT/US2011/067970, 3 pgs., (Sep. 27, 2012).

(Continued)

*Primary Examiner* — Hong Kim
(74) *Attorney, Agent, or Firm* — Nicholson De Vos Webster & Elliott LLP

(57) ABSTRACT

Some implementations disclosed herein provide techniques and arrangements for recovery of data stored in memory shared by a number of processors through information stored in a cache directory. A core of a processor may initiate access (e.g., read or write) to particular data located in a first cache that is accessible to the core. In response to detecting an error associated with accessing the particular data, a location in the processor that includes the particular data may be identified and the particular data may be copied from the location to the first cache.

23 Claims, 9 Drawing Sheets

(51) Int. Cl.
*G06F 12/12* (2006.01)
*G06F 11/20* (2006.01)

(56) References Cited

U.S. PATENT DOCUMENTS

| | | | | |
|---|---|---|---|---|
| 6,973,543 | B1* | 12/2005 | Hughes | 711/141 |
| 7,373,466 | B1* | 5/2008 | Conway | 711/156 |
| 7,412,620 | B2 | 8/2008 | Levitan | |
| 7,624,234 | B2* | 11/2009 | Handgen et al. | 711/128 |
| 8,082,469 | B2 | 12/2011 | Kobayashi et al. | |
| 2008/0091885 | A1* | 4/2008 | Guthrie et al. | 711/141 |
| 2008/0282032 | A1* | 11/2008 | Shen et al. | 711/117 |
| 2010/0100682 | A1* | 4/2010 | Guthrie et al. | 711/122 |
| 2011/0082983 | A1 | 4/2011 | Koktan | |
| 2012/0159080 | A1* | 6/2012 | Donley et al. | 711/141 |

OTHER PUBLICATIONS

PCT Written Opinion of the International Searching Authority for PCT Counterpart Application No. PCT/US2011/067970, 3 pgs., (Sep. 27, 2012).

PCT Notification concerning Transmittal of International Preliminary Report on Patentability (Chapter I of the Patent Cooperation Treaty) for PCT Counterpart Application No. PCT/US2011/067970, 5 pgs., (Jul. 10, 2014).

* cited by examiner

RECOVERING FROM DATA ERRORS USING IMPLICIT REDUNDANCY

CROSS-REFERENCE TO RELATED APPLICATION

This patent application is a U.S. National Phase Application under 35 U.S.C. §371 of International Application No. PCT/US2011/067970, filed Dec. 29, 2011, entitled RECOVERING FROM DATA ERRORS USING IMPLICIT REDUNDANCY.

TECHNICAL FIELD

Some embodiments relate to recovery of data stored in memory shared by a number of processors through information stored in a cache directory.

BACKGROUND

In certain situations, a processor may detect errors with respect to data stored in memory shared between the processor and one or more additional processors. Error recovery techniques may be utilized to recover the data. In many instances, error recovery techniques add bits to the data in order to recover the data if an error occurs. However, these error recovery techniques may be memory intensive and/or may consume a large amount of power.

BRIEF DESCRIPTION OF THE DRAWINGS

The detailed description is set forth with reference to the accompanying drawing figures. In the figures, the left-most digit(s) of a reference number identifies the figure in which the reference number first appears. The use of the same reference numbers in different figures indicates similar or identical items or features.

DETAILED DESCRIPTION

Figure 1:
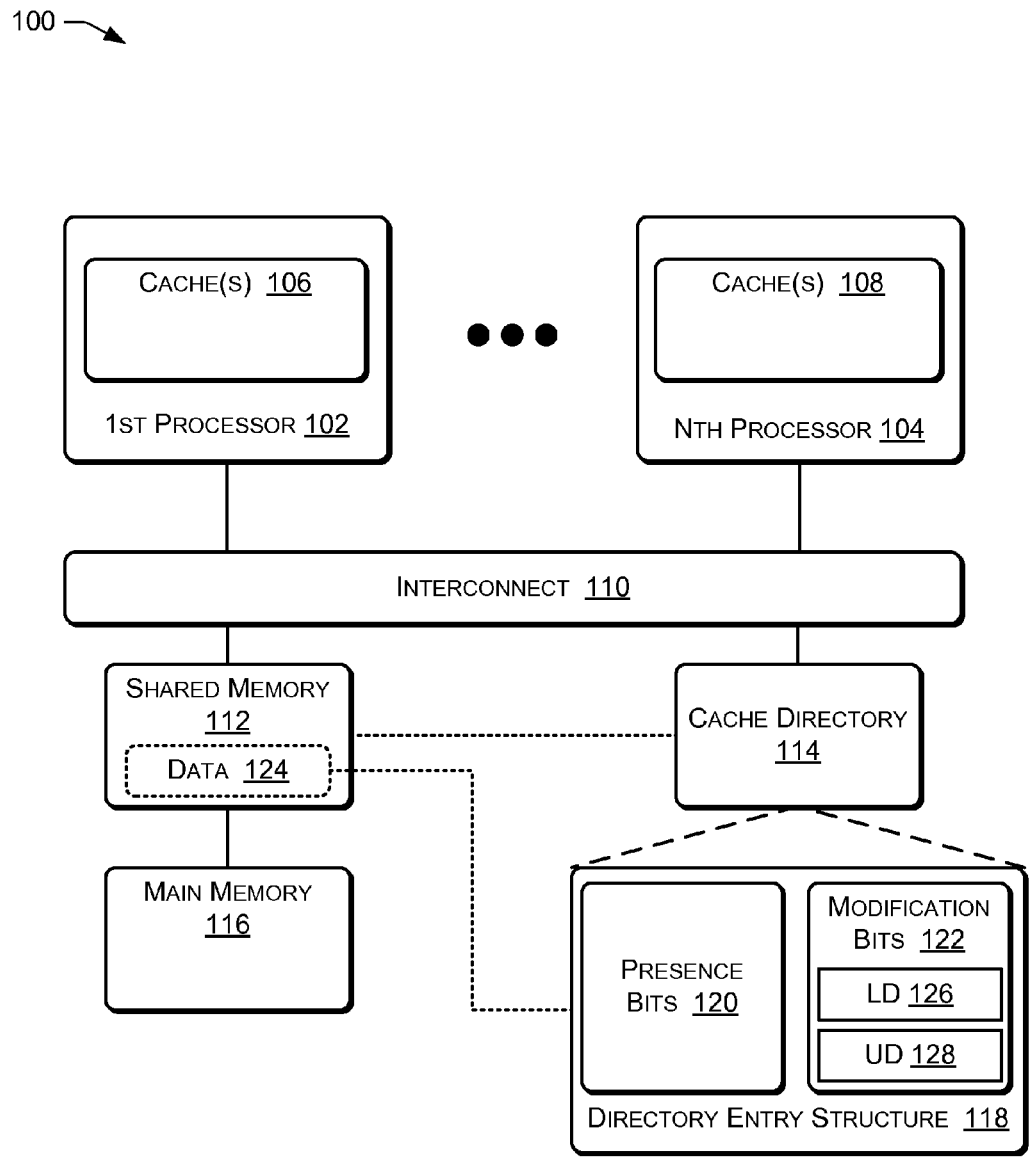
FIG. 1 illustrates an example device to recover errors in data of shared memory according to some implementations.

The technologies described herein generally relate to error recovery using data in a cache directory. One or more caches may be associated with a processor. A cache is a type of memory that stores a local copy of data or instructions to enable the data or instructions to be quickly accessed by the processor. The one or more caches may be filled by copying the data or instructions from a storage device (e.g., a disk drive or random access memory). The processor may load the data or instructions much faster from the caches than from the storage device because at least some of the caches may be physically located close to the processor (e.g., on the same integrated chip as the processor). If the processor modifies data in a particular cache, the modified data may be written back to the storage device at a later point in time.

If the processor requests a block (e.g., a block of memory that includes data or instructions) that has been copied into one or more caches, a cache hit occurs and the block may be read from one of the caches. If the processor requests a block that is not in any of the caches, a cache miss occurs and the block may be retrieved from the main memory or the disk device and filled (e.g., copied) into one or more of the caches.

When there are multiple caches, the caches may be hierarchically organized. A cache that is closest to an execution unit may be referred to as a first-level (L1) or a lower-level cache. The execution unit may be a portion of a processor that is capable of executing instructions. A cache that is farthest from the execution unit may be referred to as a last-level cache (LLC). In some implementations, a second-level (L2) cache, also referred to as a mid-level cache (MLC), may be located in between the L1 cache and the LLC, e.g., closer to the execution unit than the LLC but farther from the execution unit than the L1 cache. In some implementations, the LLC may be larger than the L1 cache and/or the L2 cache.

A particular cache may be inclusive or exclusive of other caches. For example, an LLC may be inclusive of an L1 cache. Inclusive means that when particular memory blocks are filled into the L1 cache, the particular memory blocks may also be filled into the LLC. In contrast, an L2 cache may be exclusive of the L1 cache. Exclusive means that when particular memory blocks are filled into the L1 cache, the particular memory blocks may not be filled into the L2 cache. For example, in a processor that has an L1 cache, an L2 cache, and an LLC, the LLC may be inclusive of both the L1 cache and the L2 cache while the L2 cache may be exclusive of the L1 cache. In some implementations, the LLC may be shared by multiple cores of a processor and/or multiple processors in multi-processor system.

Cache directories may store information indicating memory locations of data stored in memory that is shared by a number of processors or a number of cores. In some implementations, the shared memory may be a cache, such as a last-level cache (LLC), accessible to multiple processors or multiple cores via an interconnect, such as a bus. Respective entries of the cache directory may indicate the location of a particular block of data stored in the shared memory and a number of additional bits indicating a processor or core that has control of the particular block of data. For example, these additional bits may indicate when a processor or core has retrieved the particular block of data for a write operation. In certain cases, these additional bits may be referred to herein as presence bits. Further, entries of the cache directory may include a local cache modification ("LD") bit indicating whether a processor or core has modified the block of data associated with a respective entry. In addition, entries of the cache directory may include a field, called a shared memory modification ("UD") field (e.g., a bit), to indicate whether the copy of a particular block of data stored in the shared memory is different from a corresponding block of data stored in main memory, such as random access memory (RAM), accessible by the processors or cores.

In certain situations, the processors or cores may include logic to maintain the entries of the cache directory, as well as logic to perform certain operations upon reading or writing with respect to data stored in the shared memory and with respect to the eviction (e.g., removal) of data stored in the shared memory. For example, a processor may include logic to set the local cache modification bit of an entry for a block of data to a particular value, such as a logical one, when the processor has retrieved the block of data in order to modify the block of data. The processor may also include logic to set the shared memory modification bit to a particular value when the processor has modified a particular block of data of the shared memory such that the version of the particular block of data stored in the shared memory is different from the version of the particular block of data stored in main memory. While the examples provided herein describe processors performing various actions, the techniques described herein may also be used by multiple cores with a single processor in addition to systems with multiple processors.

Additionally, the processor may include logic to write data to one or more caches of the processor and/or to shared memory to ensure that at least two copies of the data are stored in memory accessible to the processor. To illustrate, when certain data is evicted (e.g., removed) from a cache of the processor, the processor may copy the data to another cache of the processor or to shared memory. The processor may include logic that, in response to detecting an error after initiating access to particular data, identifies a copy of the particular data in another location in the system by using information in the cache directory, and obtains the copy of the particular data from the other location. For example, a first core/processor may initiate access to particular data in the shared memory and encounter an error (e.g., read error or write error). In response, to detecting the error, the processor logic may examine the directory entry and identify at least one other core/processor that has a copy of the particular data in a local cache (e.g., L1 or L2). The processor logic may obtain a copy of the particular data from the other core/processor. For example, the processor logic may instruct the other core/processor to write the copy of the particular data to a shared memory (e.g., LLC or other shared memory) to enable the first core/processor to access the particular data from the shared memory. As another example, the processor logic may instruct the other core/processor to make a copy of the particular data and send the copy to the first core/processor to enable the first core/processor to write the particular data to the shared memory.

In some situations, the processor may implement a write through cache where particular data that is written to one cache level (e.g., L1) is also written to a next level cache (e.g., L2). In these situations, the entries in the cache directory may provide the processor and certain additional processors with information indicating where a copy of particular data is stored. Thus, the processors may access the cache directory to obtain the location of a valid copy of the particular data when an error occurs with respect to the particular data. Additionally, by executing certain write operations when data is evicted (e.g., removed) from a cache of the processor, multiple copies of the data may be stored and may be accessible to processors coupled to the shared memory for error recovery. By storing the shared memory modification bit in the cache directory and modifying a cache coherence protocol that writes data to certain memory locations upon eviction, the techniques described herein may reduce the power consumption and memory space utilized to implement error recovery with respect to data stored in memory shared by a plurality of processors. In addition, latency may be reduced by not calculating errors code as is performed in systems that use error codes for error recovery.

In some implementations, certain fields (e.g., bits) in the cache directory may be used to indicate a state of particular data (e.g., a block) in the shared memory (e.g., LLC) and how many processors have a copy of the particular data. For example, in a system or device with N processors, for each processor $P_N$, a presence bit may indicate whether the processor has a copy of the particular data. A local cache modification ("LD") bit may indicate whether the particular portion has been modified locally. For example, the LD bit may indicate that a particular processor has copied the particular data from the memory and modified the copy of the particular data. A shared memory modification ("UD") bit may indicate that particular data in a shared memory is modified ("dirty") with respect to a next level memory. The mechanism described herein may provide that at least two copies of the same particular data are available (e.g., in a cache or in shared memory) to enable recovery without using error recovery codes or other costly error recovery mechanisms.

The UD bit may keep track of whether particular data in a shared memory (e.g., LLC) is dirty with respect to a next level memory (e.g., main memory). For example, the UD bit may indicate that a first processor read particular data from a shared memory (e.g., LCC), modified the particular data, and the modified particular data has not yet been written to main memory. In addition, when a particular portion of memory is evicted from a lower-level cache (e.g., L1 or L2), and a write-back to a higher-level cache (e.g., L2 or shared memory) may be performed to provide at least two copies of the particular portion of memory.

Read Miss

When a read miss occurs a processor may obtain a copy of the data to store in local caches of the processor. Because the data may be in more than one location (e.g., a copy of the data may reside in the shared memory), a determination may be made whether the data has been copied and has been modified by another (e.g., a second) processor by checking the LD bit. If a determination is made that the data has been modified, the second processor that has a copy of the data may update the shared memory (e.g., LLC), unset the LD bit, and send a copy of the data to the processor. The UD bit may be set to indicate that the data in the shared memory is dirty. The word "unset" is used to indicate that a binary value of a bit is changed from a prior setting. For example, if a bit is set to a value of one, unsetting the bit causes the bit to have a value of zero. Note that the UD bit may have already been set from a previous write. If the LD bit indicates that the data has not been modified, the data is copied to the processor and the presence bit of the directory may be set to indicate that the processor has a copy of the data.

Write Miss

When a write miss occurs, a determination may be made by checking the presence bits as to whether another processor has a copy of the data and a determination may be made by checking the LD bit whether the data is dirty (e.g., modified). If another processor owns the data and the data is dirty, the processor may copy the data from the other processor and take ownership. In some implementations, the shared memory may be updated with the copy of the data from the other processor. If the shared memory is updated with the copy of the data from the other processor, the UD bit may be set to indicate that the data in the shared memory is dirty with respect to a next level memory.

Write Hit

If a write hit occurs to data that is not shared with other cores, there will be two copies of the data, assuming that any write to a first level cache is also performed (e.g., written-through) to the second level cache. If a write hit occurs to data that is shared with other cores, the other cores may invalidate their own copies of the data. Because the hit indicates that the data is stored in the first level cache, the UD bit is not modified. Since it is a write operation, the LD bit is set.

Eviction from L1 Cache

Each cache line at every cache level may have state bits that indicate whether the data is exclusive (e.g., modified) or shared. When a cache is a write-through cache, if the cache line that is going to be evicted has been modified, then there are two valid copies in the system, e.g., a copy of the data in the L1 cache and a copy of the data in the L2 cache. Therefore, a write-back of the data in the second-level cache may be performed to provide a copy of the data in the shared memory (e.g., LLC). The UD bit may be set to indicate that the copy of the data in the shared memory (e.g., LLC) is dirty (e.g., modified) compared to the data in main memory. In this situation, there are two copies, one copy of the data in the L2 cache and one copy of the data in the shared memory (e.g., LLC). In some implementations, the LD bit may be unset. If the cache line in the L1 cache that is being evicted is not dirty, then there is at least one extra copy of the data in the shared memory (e.g., LLC) and the copy of the data is valid.

Eviction from L2 Cache

If the UD bit is not set, there are at least two copies, one copy in the shared memory (e.g., LLC) and another copy in the next level memory (e.g., main memory). However, if the UD bit is set, then the copy of the data in the shared memory is dirty. A determination may be made (e.g., by checking the presence bits of the directory) whether any other processors have a copy of the data. If another processor has a copy of the data then there are at least two copies. If none of the other processors has a copy of the data, a write-back of the data in the shared memory (e.g., LLC) may be performed to the next level memory (e.g., main memory). In addition, the UD bit may be unset to indicate that the data is no longer dirty.

Eviction from Shared Memory

A determination may be made whether a UD bit is set. If the UD bit is not set, there are at least two copies, one copy in the shared memory (e.g., LLC) and another copy in the next level memory (e.g., main memory). If the UD bit is not set, particular data may be evicted from shared memory (e.g., last-level cache (LLC) or other type of shared memory). If the UD bit is set, then the UD bit may be unset and the particular data may be evicted from the shared memory.

FIG. 1 illustrates an example device 100 that includes a cache directory according to some implementations. For example, the device 100 may be a computing device, such as a laptop computing device, personal computing device, wireless computing device (e.g., a wireless phone), or other consumer electronics device (e.g., multimedia playback device). The device 100 includes N processors (where N is greater than one), such as a first processor 102 through to an Nth processor 104. Each of the N processors may include one or more caches. For example, the first processor 102 may include one or more caches 106 and the Nth processor 104 may include one or more caches 108. The caches 106, 108 may include multiple levels of data caches. Each level of data cache may refer to the proximity of a respective cache to execution logic of the respective processor 102, 106. For example, a level-one ("L1") cache may be closer to the execution logic than a higher-level cache, such as a level-two ("L2") cache.

The processors 102 to 104 may be coupled to each other via an interconnect 110, such as a bus. The interconnect 110 may provide the processors 102 to 104 with access to certain components of a device, such as a shared memory 112, a cache directory 114, and a main memory 116 (e.g., random access memory). In some implementations, the shared memory may be a last level cache (LLC). The cache directory 114 may include a number of entries that indicate locations of data stored in the shared memory 112. Each entry of the cache directory 114 may include a structure, such as a directory entry structure 118. The directory entry structure 118 may include one or more presence bits 120 and one or more modification bits 122. The directory entry structure 118 may provide information associated with data 124 in the shared memory 112. The data 124 in the shared memory 112 may be a copy of the data 124 that is stored in the main memory 116.

In some implementations, the presence bits 120 may include N bits that correspond to the N processors 102 to 104 to specify whether a respective processor 102 to 104 has obtained a copy of particular data (e.g., the data 124) from the shared memory 112. The modification bits 122 may include an LD bit 126 that indicates that a processor has obtained a copy of particular data to modify the particular data and a UD bit 128 to indicate that the particular data in a shared memory (e.g., LLC) is dirty with respect to a next level memory. The presence bits 120 indicate which of the N processors have a copy of particular data (e.g., the data 124). For example, the $N^{th}$ presence bit may indicate that the data 124 is being read by the $N^{th}$ processor or being modified by the $N^{th}$ processor. If the $N^{th}$ processor is reading the data 124, the LD bit 126 is not set and the $N^{th}$ presence bit is set. If the $N^{th}$ processor is modifying the data 124, the LD bit 126 is set and the $N^{th}$ presence bit is set. If the LD bit 126 is not set, one or more of the presence bits 120 may be set for the data 124 to indicate that more than one processor may have read a copy of the data 124. However, if the LD bit 126 is set, only one of the presence bits 120 is set, e.g., only one processor may have a copy of the data 124 for modification at a given time.

Thus, the respective entry (e.g., the directory entry structure 118) associated with the particular data (e.g., the data 124) may store modification bits 122 that include the LD bit 126 and the UD bit 128. The LD bit 126 may specify whether a particular processor has modified the data associated with a particular entry of the cache directory 114. The UD bit 128 may indicate whether a copy of particular data stored in the shared memory 112 has been modified (e.g., whether the particular data is "dirty") relative to the particular data stored in the main memory 116. For example, the UD bit 128 may indicate that particular data has been read, modified, and written to the shared memory 112 but has not yet been written to the main memory 116. After retrieving the particular data (e.g., the data 124) from memory, such as the shared memory 112 or the main memory 116, the processor 102 may modify the particular data according to one or more operations. The processor 102 may update the LD bit 126 for the entry (e.g., the directory entry structure 118) associated with the particular data (e.g., the data 124) to indicate that the processor 102 has modified the particular data. Thus, the entry in the cache directory 114 for the particular data may include a presence bit for the processor 102 set to a value of one indicating that the processor 102 owns the particular data and the entry may include LD bit 126 to indicate that the processor 102 has modified the particular data. When the LD bit 126 is set, at least one of the caches 106 of the processor 102 may include a copy of the modified data. When the processor 102 writes the modified data to the shared memory 112, the processor 102 may set the UD bit 128 for the entry of the particular data in the cache directory 114 to indicate that the modified data stored in the shared memory 112 is different from (e.g., modified compared to) the particular data stored in the main memory 116.

When an error occurs with respect to accessing data stored in the local caches 106 and 108, the shared memory 112, or another memory accessible to the N processor 102 to 104, a processor that is requesting access to the data may access the cache directory 114 to identify a location of a current copy of the data. To illustrate, an error may occur with respect to particular data (e.g., the data 124) accessed by the processor 102. The processor 102 may access an entry of the cache directory 114 corresponding to the data. If one of the presence bits 120 is set for a particular processor, such as the processor 104, the processor 102 may detect that one of the caches 108 of the Nth processor 104 includes a copy of the data. The processor 102 may then retrieve the version of the modified data stored in the cache 108 to perform one or more operations on the modified data. Additionally, if the UD bit 128 for the entry is set, the processor 102 may detect that the shared memory 112 stores a modified version of the data and obtain the modified version of the data from the shared memory 112 to perform one or more operations. If a presence bit for one or more processors is set for the entry in the cache directory 114, the processor 102 may retrieve a copy of the data from any of the processors storing the data and then perform one or more operations with respect to the data.

Thus, by providing entries in the cache directory 114 that include the presence bits 120 and the modification bits 122, a mechanism is provided to enable identifying which of the N processors 102 to 104 has a copy of particular data in their respective caches and whether the data has been modified. The directory entry structure 118 may enable the N processors 102 to 104 to maintain at least two copies of particular data at any given time. Thus, if an error occurs with respect to a copy of the particular data, the directory entry structure 118 enables another copy of the particular data to be obtained. In this way, the device 100 may avoid implementing conventional error correction mechanisms that consume processor resources and/or power and contribute to latency.

Figure 2:
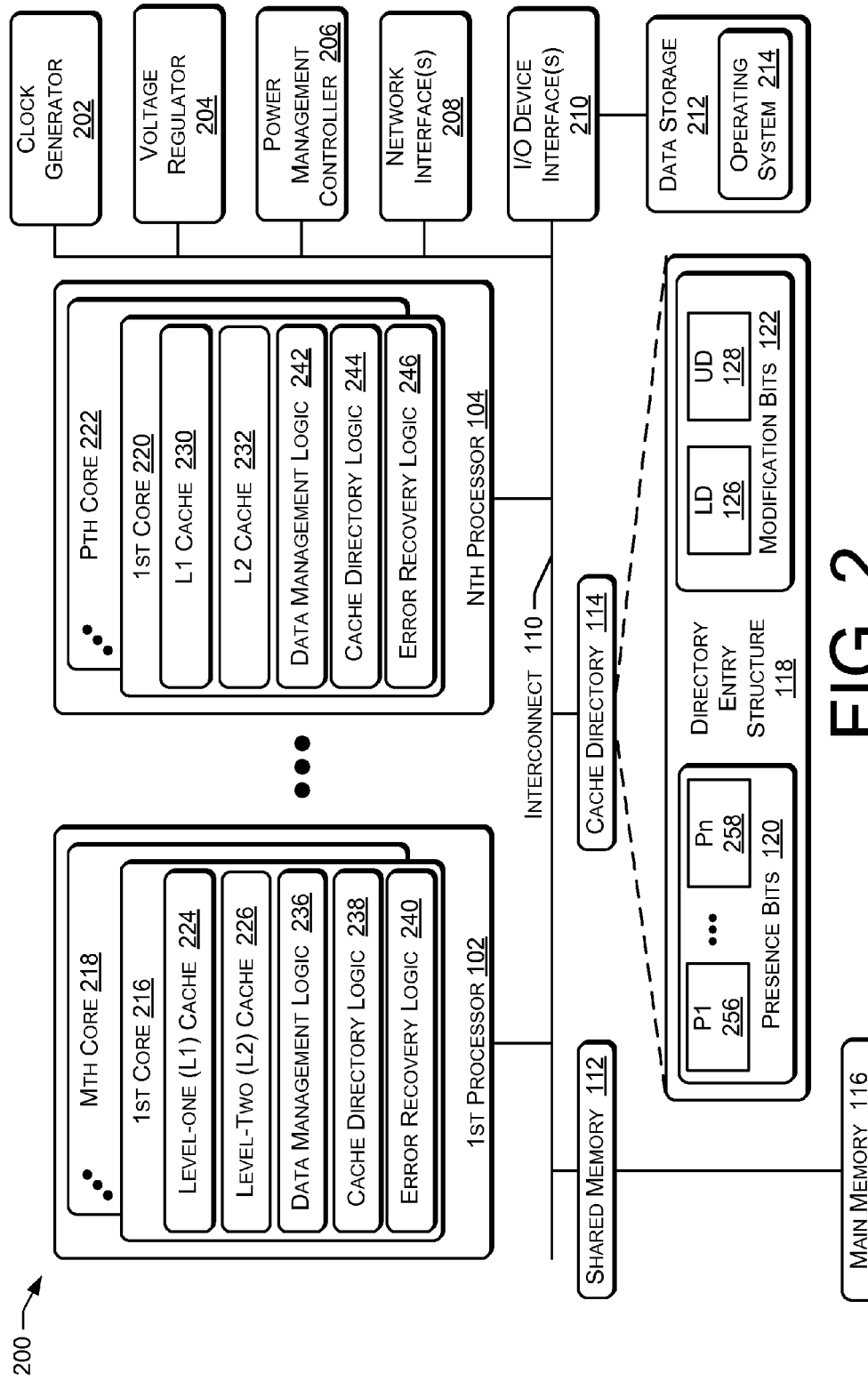
FIG. 2 illustrates an example system to recover errors in data of shared memory according to some implementations.

FIG. 2 illustrates an example system 200 that includes multiple processors according to some embodiments. For example, the device 200 may be a computing device, such as a laptop computing device, personal computing device, wireless computing device (e.g., a wireless phone), or other consumer electronics device (e.g., multimedia playback device).

The device 200 may include the N processors 102 to 104, the interconnect 110, the shared memory 112, the cache directory 114, the main memory 116, and the directory entry structure 118 of FIG. 1. The device 200 may also include a clock generator 202 to generate a clock signal, a voltage regulator 204 to regulate a voltage source (e.g., a power supply or a battery), a power management controller 206 to manage power modes (e.g., on, off, standby, hibernate, and the like), a network interface 208 to enable access to a network, and one or more input/output device interfaces 210. The I/O device interfaces 210 may be coupled to data storage 212, such as one or more storage devices (e.g., disk drives). An operating system 214 may be installed on the data storage 212.

The first processor 102 may include M cores, such as a first core 216 and an Mth core 281 (where M is greater than one). The Nth processor 104 may include P cores, such as first core 220 and a Pth core 222 (where P is greater than one). Each of the cores 216, 218, 220, and 222 may include one or more levels of a cache hierarchy. In the implementation illustrated in FIG. 2, the first core 216 of the first processor 102 may include an L1 cache 223 and an L2 cache 226. In addition, the first core 220 of the second processor 104 may include an L1 cache 230 and an L2 cache 232. Of course, in other implementations, one or more of the cores 216, 218, 220, or 222 may include greater than or fewer than two levels of cache.

Each of the N processors 102 to 104 may include logic to perform various functions. For example, as illustrated in FIG. 2, the first processor 102 may include data management logic 236, cache directory logic 238, and error recovery logic 240. The second processor 104 may include data management logic 242, cache directory logic 244, and error recovery logic 246. The data management logic 236 may include logic to access (e.g., read or write) data in various locations, including the caches 224 or 226, the shared memory 112, or the main memory 116. The data management logic 242 may include logic to access (e.g., read or write) data in various locations, including the caches 230 or 232, the shared memory 112, or the main memory 116. The cache directory logic 238 and 244 may include logic to access contents of the cache directory 114 and to read and modify portions of the directory entry structure 118.

The error recovery logic 240 and 246 may include logic to recover from errors, such as errors caused when accessing data in a particular location. For example, in response to detecting an error when accessing data in a particular location, the error recovery logic 240 or 246 may obtain a copy of the data from another location, such as one of the caches 224, 226, 230, 232, the shared memory 112, or the main memory 116. In some implementations, the error recovery logic 240 or 246 may use the cache directory logic 238 or 244 to identify another location that includes the data. The error recovery logic 240 or 246 may use the data management logic 236 or 242 to obtain a copy of the data from the other location.

The directory entry structure 118 may include various structures, such as the presence bits 120, the LD bit 126, and the UD bit 128. The presence bits 120 may include N bits P1 256 to Pn 258 that correspond to the N processors 102 to 104. For example, when a particular processor (e.g., processor j where 1≤j≤N) obtains a copy of particular data from the shared memory 112, the particular processor may set the appropriate presence bit (e.g., Pj) to indicate that the particular processor has a copy of the particular data. When the particular processor no longer has a copy of the particular data, the particular processor may unset the appropriate presence bit (e.g., Pj) to indicate that the particular processor no longer has a copy of the particular data.

The modification bits 122 may include a first field, such as a local cache modification ("LD") bit 126, and a second field, such as a shared memory modification ("UD") bit 128. The LD bit 126 may indicate whether the particular processor has modified the copy of the particular data. For example, when the presence bit Pj is set and the LD bit 126 is set, the directory entry structure 118 indicates that the processor j has a copy of particular data corresponding to the directory entry structure 118 and has modified the particular data but the modified particular data has not yet been written back to the main memory 116.

When another processor (e.g., processor k) encounters an error accessing particular data, the processor k may obtain a copy of the particular data from another processor j if the particular data is not available elsewhere. A more detailed explanation of how the LD bit 126 and the UD bit 128 may be set under different circumstances (e.g., read, write, and cache eviction) is provided below in the descriptions for FIGS. 3-6.

Example Processes

In the flow diagrams of FIGS. 3, 4, 5, and 6, each block represents one or more operations that can be implemented in hardware, firmware, software, or a combination thereof. The blocks represent logic that, when executed, cause the processors to perform the recited operations. The order in which the blocks are described is not intended to be construed as a limitation, and any number of the described operations can be combined in any order and/or in parallel to implement the processes. For discussion purposes, the processes 300, 400, 500, and 600 are described with reference to the architectures 100 and 200 as described above, although other models, frameworks, systems and environments may implement these processes.

Figure 3:
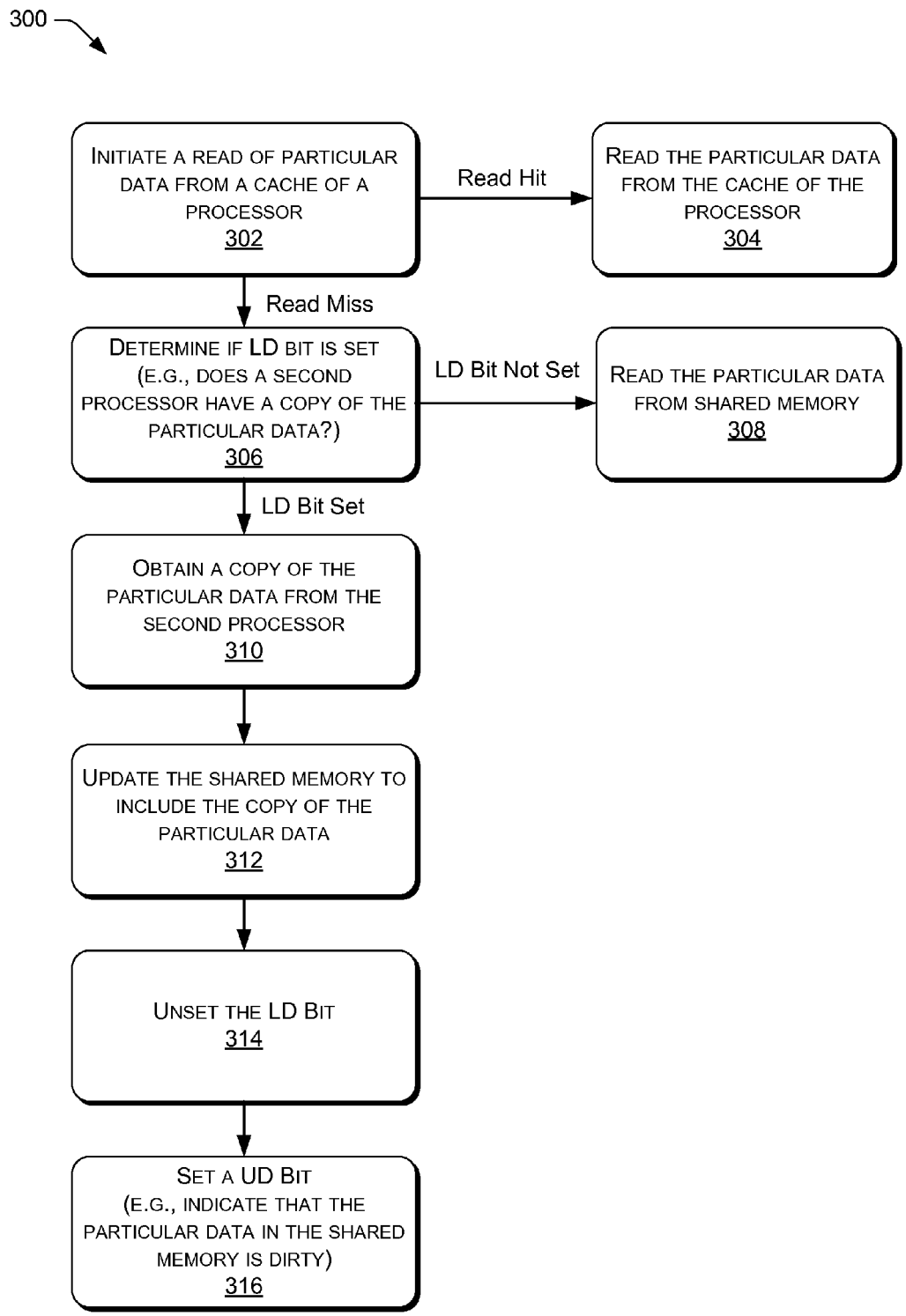
FIG. 3 illustrates a flow diagram of an example process to maintain entries of a cache directory in relation to read operations.

FIG. 3 illustrates a flow diagram of an example process 300 to maintain entries of a cache directory in relation to read operations. The process 300 may be performed by any of the N processors 102 to 104 of FIG. 2.

At 302, a read of particular data from a cache of a processor is initiated. For example, in FIG. 2, the first processor 102 may initiate a read of particular data from one of the caches 224 or 226. If a read hit occurs, at 302, the particular data is read from the cache of the processor, at 304. For example, in FIG. 2, the first processor 102 may read the particular data from one of the caches 224 or 226. In addition, an appropriate presence bit may be set. For example, in FIG. 2, the processor 102 may set the corresponding presence bit (e.g., the first presence bit 256) to indicate that the processor 102 has a copy of the particular data.

If a read miss occurs, at 302, a determination is made whether an LD bit is set, at 306. For example, in FIG. 2, the first processor 102 that initiated the read may examine the directory entry structure 118 to determine if the LD bit 126 is set (e.g., indicating that a second processor has a copy of the particular data).

If a determination is made that the LD bit is not set, at 306, the particular data is read from the memory, at 308. For example, in FIG. 2, if the first processor 102 that initiated the read determines that the LD 126 bit is not set (e.g., none of the N processors 102 to 104 currently have a copy of the particular data), the processor may retrieve the particular data from the main memory 116 and place the particular data in a cache of the processor. For example, in FIG. 2, the first processor 102 may store the particular data in one of the caches 224 or 226. In addition, the processor may set the LD bit 126 to indicate that the processor has a copy of the particular data in the in a cache of the processor. In addition, an appropriate presence bit may be set. For example, in FIG. 2, the processor 102 may set the corresponding presence bit (e.g., the first presence bit 256) to indicate that the processor 102 has a copy of the particular data.

If a determination is made that the LD bit is set, at 306, then the particular data is obtained from the second processor, at 310. For example, in FIG. 2, the first processor 102 may obtain a copy of the particular data from the Nth processor 104. To illustrate, the particular data may be obtained from one of the caches 230 or 232.

At 312, the shared memory may be updated to include the copy of the particular data. For example, in FIG. 2, the first processor 102 may write the copy of the particular data to the shared memory 112.

At 314, the LD bit may be unset. For example, in FIG. 2, the first processor 102 may unset the LD bit 126. In addition, an appropriate presence bit may be set. For example, in FIG. 2, the processor 102 may set the corresponding presence bit (e.g., the first presence bit 256) to indicate that the processor 102 has a copy of the particular data.

At 316, the processor may set the UD bit to indicate that that the particular data in the shared memory is dirty. For example, in FIG. 2, the first processor 102 may set the UD bit 128 to indicate that the particular data in the shared memory 112 has been modified but has not yet been written back to main memory.

Figure 4:
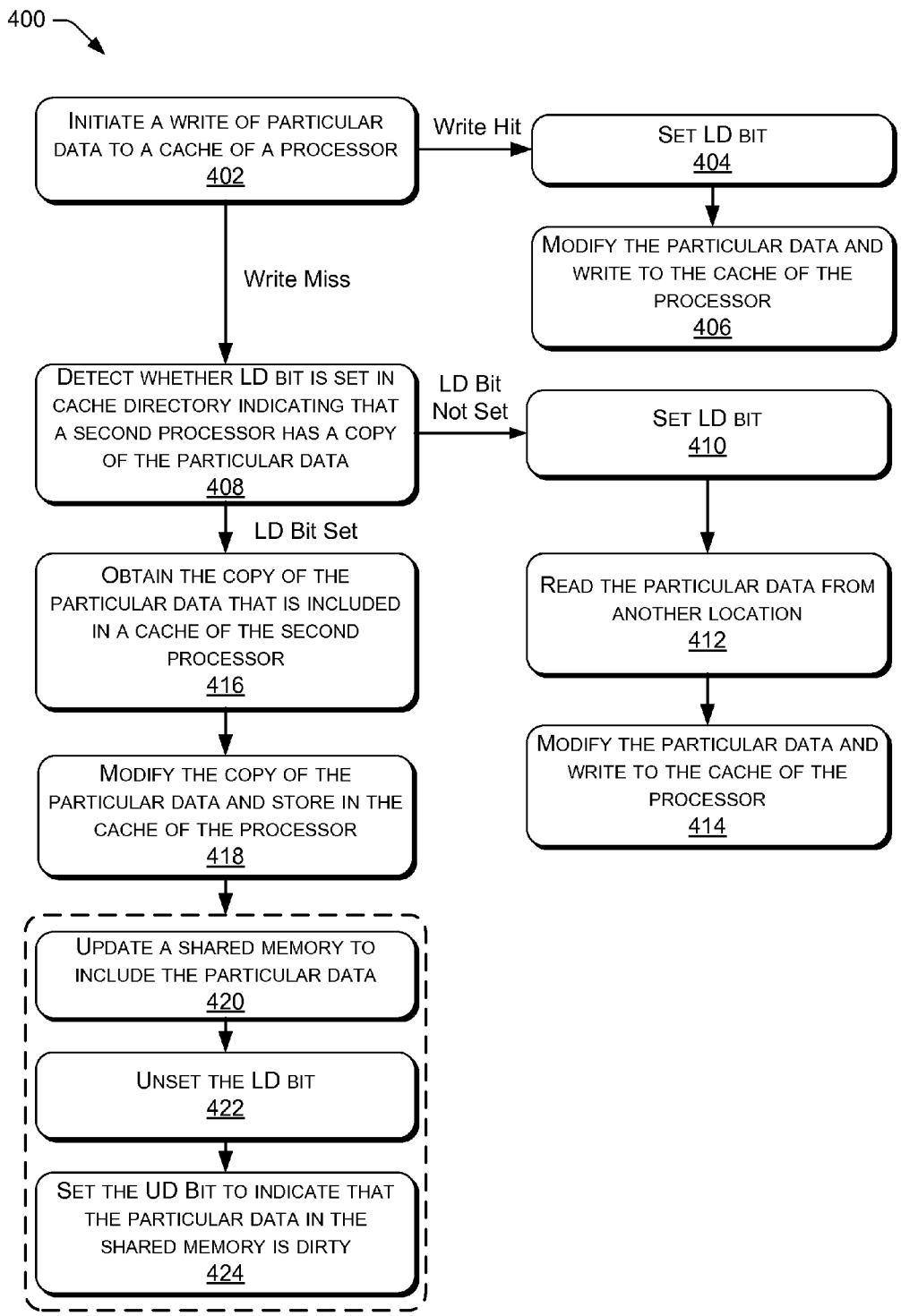
FIG. 4 illustrates a flow diagram of an example process to maintain entries of a cache directory in relation to write operations.

FIG. 4 illustrates a flow diagram of an example process to maintain entries of a cache directory in relation to write operations. The process 400 may be performed by any of the N processors 102 to 104 of FIG. 2.

At 402, a write of particular data is initiated to a cache of a processor. If a write hit occurs, at 402, the LD bit may be set, at 404. At 406, the particular data may be modified and written to the cache of the processor. A write hit may occur when the processor is able to find and modify the particular data in a cache memory (e.g., L1, L2, or LLC) of the processor, e.g., without performing a write operation to main memory. For example, in FIG. 2, when the first processor 102 initiates a write of particular data (e.g., in response to the first processor 102 modifying the particular data), a write hit may occur when the particular data is included in at least one of the caches 224 or 226. If a write hit occurs, the processor 102 may set the LD bit 126, modify the particular data, and write the particular data to at least one of the caches 224 or 226.

If a write miss occurs, the processor may find a copy of the particular data in a cache of another processor. At 408, the processor may detect whether the LD bit is set indicating that the second processor has a modified copy of the particular data. For example, in FIG. 2, the first processor 102 may determine whether the LD bit 126 is set indicating that another processor has a copy of the particular data.

If the processor detects that the LD bit is not set, at 408, then the processor may set the LD bit, at 410. At 412, the processor may read (e.g., copy) the particular data from another location, e.g., main memory or from the cache of another processor that has a copy of the particular data. In some cases, an appropriate presence bit may be set. For example, in FIG. 2, the processor 102 may set the corresponding presence bit (e.g., the first presence bit 256) to indicate that the processor 102 has a copy of the particular data. At 414, the processor may modify the particular data and write the modified particular data to a cache of the processor. For example, in FIG. 2, if the first processor 102 determines that the LD bit 126 is not set, the first processor 102 may set the LD bit 126, read the particular data from the main memory 116 or any of the caches (e.g., caches 224, 226, 230, or 232) associated with the N processors 102 to 104, modify the particular data, and write the modified particular data to one of the caches 224 or 226.

If the processor detects that the LD bit is set, at 408, the processor may obtain the copy of the particular data from a cache of the second processor, at 416. In some cases, an appropriate presence bit may be set. For example, in FIG. 2, the processor 102 may set the corresponding presence bit (e.g., the first presence bit 256) to indicate that the processor 102 has a copy of the particular data. At 418, the processor may modify the copy of the particular data and store the modified particular data in the cache of the processor. For example, in FIG. 2, the first processor 102 may determine that the LD bit 126 is set, indicating that another processor, such as the Nth processor 104, has a copy of the particular data in one of the caches 230 or 232. The first processor 102 may obtain a copy of the particular data that is included in one of the caches 230 or 232 of the Nth processor 104. The first processor 102 may modify the particular data and store the modified particular data in one or one of the caches 224 or 226.

In some cases, the processor may update a last level cache, at 420, unset the LD bit, at 422, and set the UD bit to indicate that the particular data in the shared memory is dirty (e.g., modified) with reference to the particular data stored in the main memory, at 424. For example, in FIG. 2, the first processor 102 may update the shared memory 112 (e.g., LLC), unset the LD bit 126 to indicate that the Nth processor 104 no longer has exclusive access to the particular data, and set the UD bit 128 to indicate that more than one processor has a copy of particular data.

Figure 5:
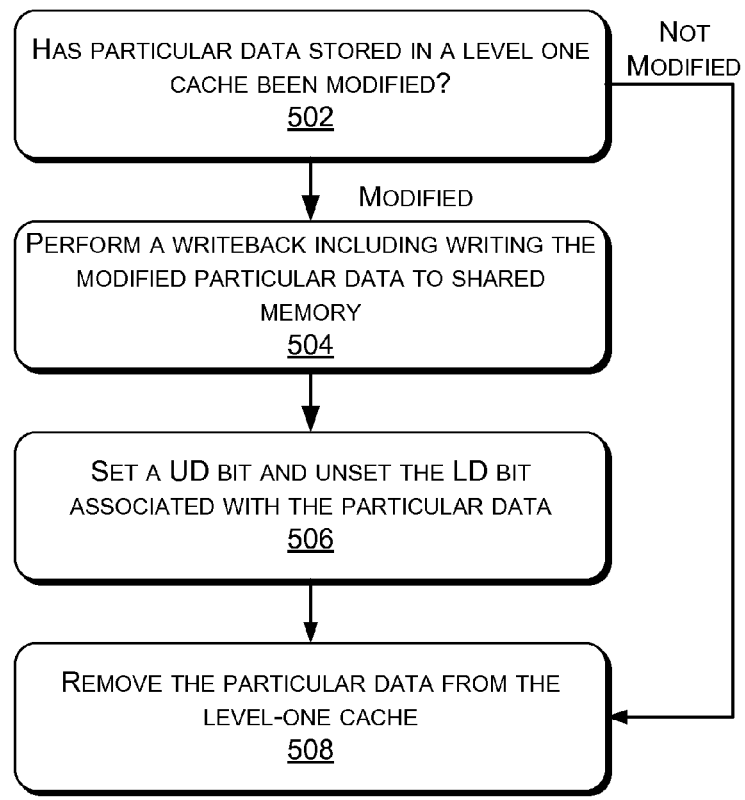
FIG. 5 illustrates a flow diagram of an example process to maintain entries of a cache directory when evicting data from a level-one cache of a processor.

FIG. 5 illustrates a flow diagram of an example process 500 to maintain entries of a cache directory when evicting data from processor level-one (L1) cache of a processor. The process 400 may be performed by any of the N processors 102 to 104 of FIG. 2.

At 502, a determination is made whether particular data in the L1 cache has been modified (e.g. "dirty").

If a determination is made that the particular data in the L1 cache is modified (e.g. "dirty"), at 502, a writeback is performed at 504. The writeback may include writing the modified particular data to shared memory. For example, in FIG. 2, the first processor 102 may write may perform a writeback by writing particular data that is included in the L1 cache 224 to the shared memory 112.

At 506, a UD bit associated with the particular data may be set and, optionally, the LD bit associated with the particular data may be unset. For example, in FIG. 2, after performing the writeback, the processor 102 may set the UD bit 128 and unset the LD bit 126 to indicate that the particular data in the shared memory has been modified relative to the particular data in the main memory.

At 508, the particular data may be removed from L1 cache. For example, in FIG. 2, after performing the writeback, the first processor 102 may evict the particular data from the L1 cache 224. In some cases, an appropriate presence bit may be unset. For example, in FIG. 2, the processor 102 may unset the corresponding presence bit (e.g., the first presence bit 256) to indicate that the processor 102 does not have a copy of the particular data.

If a determination is made that the particular data in the L1 has not been modified, at 502, there are at least two copies of the same data (in L2 and the shared memory) and the particular data may be removed from L1, at 508. For example, in FIG. 2, if the first processor 102 determines that the LD bit 126 is not set (e.g., the data is not dirty), the first processor 102 may evict the particular data from the L1 cache 224. In some cases, an appropriate presence bit may be unset. For example, in FIG. 2, the processor 102 may unset the corresponding presence bit (e.g., the first presence bit 256) to indicate that the processor 102 no longer has a copy of the particular data.

Figure 6:
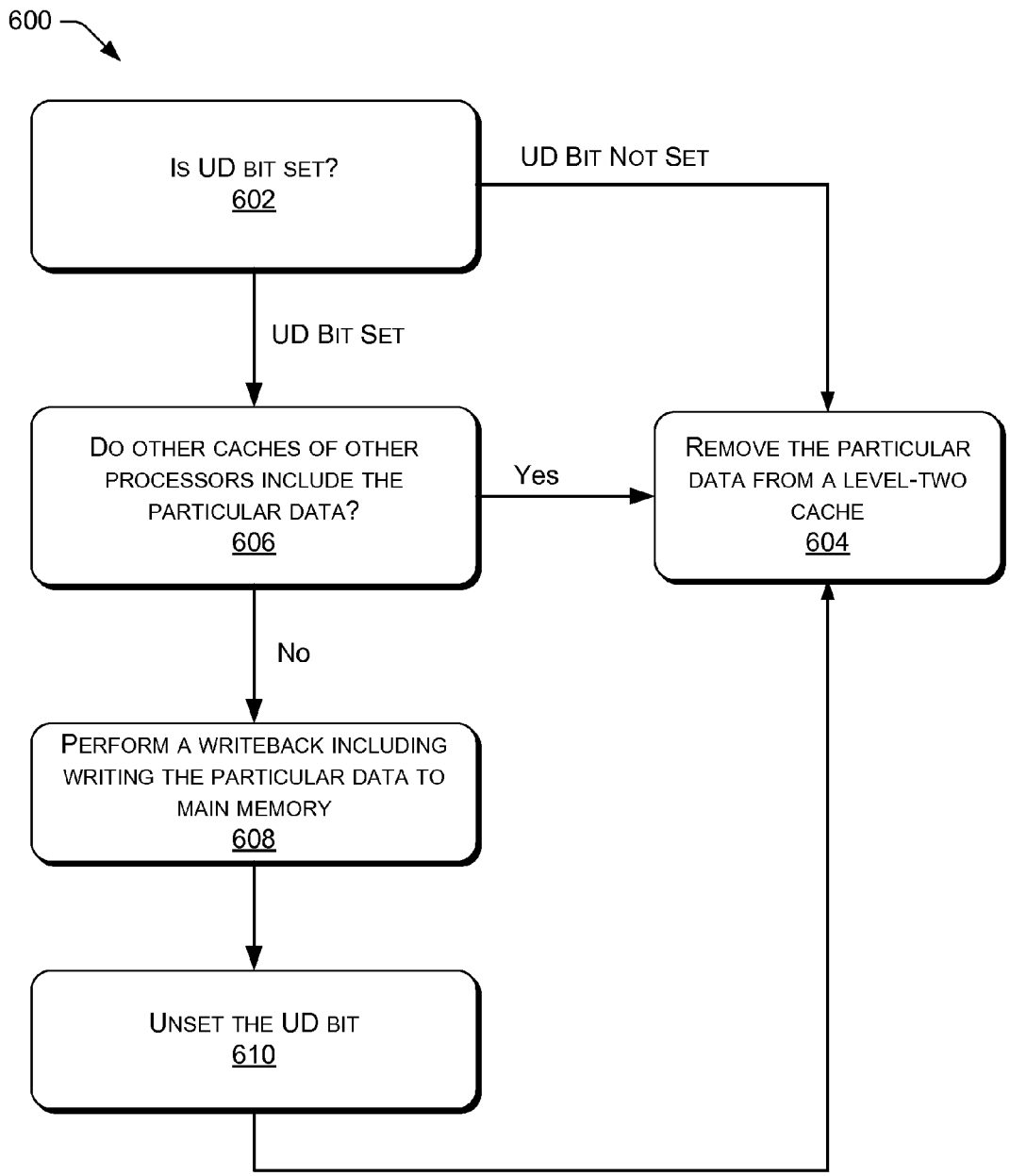
FIG. 6 illustrates a flow diagram of an example process to maintain entries of a cache directory when evicting data from a level-two cache of a processor.

FIG. 6 illustrates a flow diagram of an example process to maintain entries of a cache directory when evicting data from a level-two (L2) cache of a processor. The process 400 may be performed by any of the N processors 102 to 104 of FIG. 2.

At 602, a determination is made whether a UD bit is set. For example, in FIG. 2, a processor, such as the first processor 102, may determine whether the UD bit 128 is set indicating that particular data in the shared memory 112 is dirty (e.g., modified) with respect to the particular data in the main memory. In response to determining that the UD bit is not set, at 602, the particular data is removed from an L2 cache at 604. For example, in FIG. 2, the first processor 102 may determine that the UD bit 128 is not set (e.g., indicating that the shared memory and the main memory have the same data) and remove the particular data from the L2 cache 226. In some cases, an appropriate presence bit may be unset. For example, in FIG. 2, the processor 102 may unset the corresponding presence bit (e.g., the first presence bit 256) to indicate that the processor 102 no longer has a copy of the particular data.

In response to determining that the UD bit is set, at 602, a determination is made whether other caches of other processors include the particular data (e.g., by examining the presence bits), at 606. In response to determining that other caches of other processors include the particular data, at 606, the particular data may be removed from the L2 cache, at 604. For example, in FIG. 2, the first processor 102 may examine the N presence bits 256 to 258 to determine whether at least one other processor has a copy of the particular data and remove the particular data from the L2 cache 226 if at least one other processor has the copy of the particular data. In some cases, an appropriate presence bit may be unset. For example, in FIG. 2, the processor 102 may unset the corresponding presence bit (e.g., the first presence bit 256) to indicate that the processor 102 no longer has a copy of the particular data.

In response to determining that other caches of other processors do not include (e.g., exclude) the particular data, at 606, a writeback may be performed, at 608. The writeback may include writing the particular data to main memory. For example, in FIG. 2, if the first processor 102 determines that the other processors do not include the particular data, the first processor 102 may perform a writeback to the main memory 116.

At 610, the UD bit may be unset to indicate that the particular data in the shared memory is no longer dirty (e.g., modified) as compared to the main memory because the particular data was written back to the main memory. For example, in FIG. 2, the first processor 102 may unset the UD bit 128 after writing particular data that is included in the shared memory 112 to the main memory 116. The process may proceed to 604, where the particular data may be removed from the L2 cache. For example, in FIG. 2, the first processor 102 may remove the particular data from the L2 cache 226.

Figure 7:
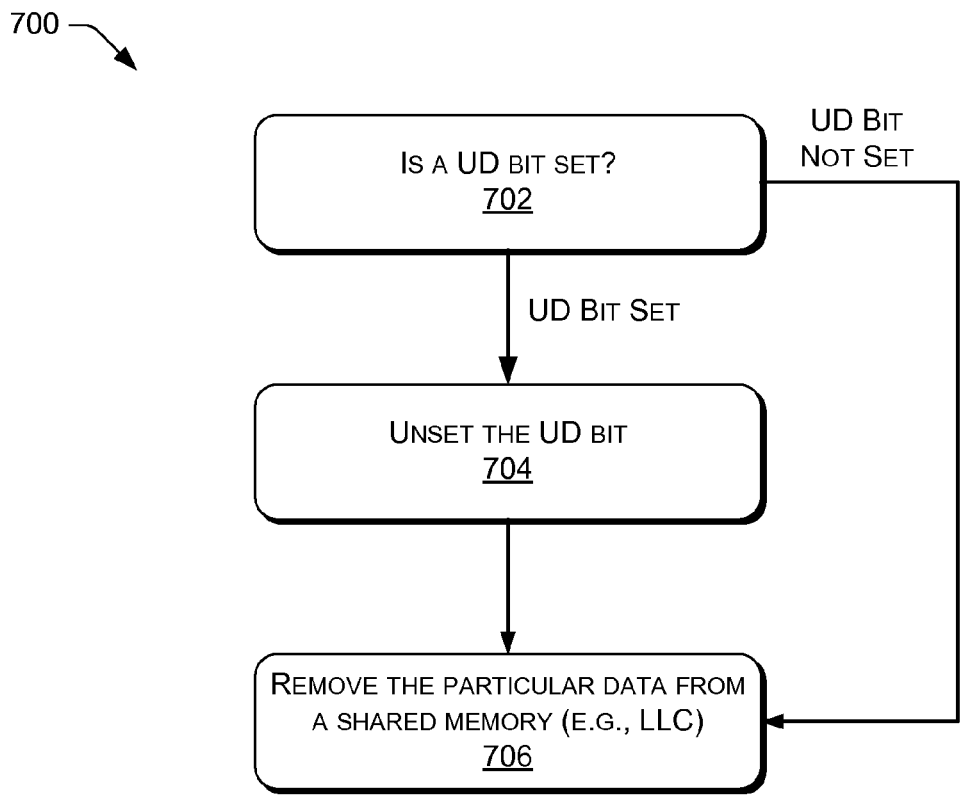
FIG. 7 illustrates a flow diagram of an example process to maintain entries of a cache directory when evicting data from a shared memory.

FIG. 7 illustrates a flow diagram of an example process 700 to maintain entries of a cache directory when evicting data from a shared memory (e.g., an LLC). The process 700 may be performed by one of the N processors 102 to 104 of FIG. 2.

At 702, a determination is made whether the UD bit is set, indicating that particular data in the shared memory is dirty (e.g., modified) with reference to particular data stored in the main memory. For example, in FIG. 2, the Nth processor 104 may examine the UD bit 128 to determine whether the UD bit 128 is set.

In response to determining that the UD bit is set, at 702, the UD bit is unset, at 704, and the particular data is removed from the shared memory, at 706. If the Nth processor 104 determines that the UD bit 128 is set, the Nth processor 104 may unset the UD bit 128 and initiate removal (e.g., eviction) of the particular data from the shared memory 112.

In response to determining that the UD bit is not set, at 702, the particular data is removed from the shared memory, at 706. For example, in FIG. 2, the Nth processor 104 may examine the UD bit 128 and determine that the UD bit 128 is not set and initiate removal (e.g., eviction) of the particular data from the shared memory 112.

Figure 8:
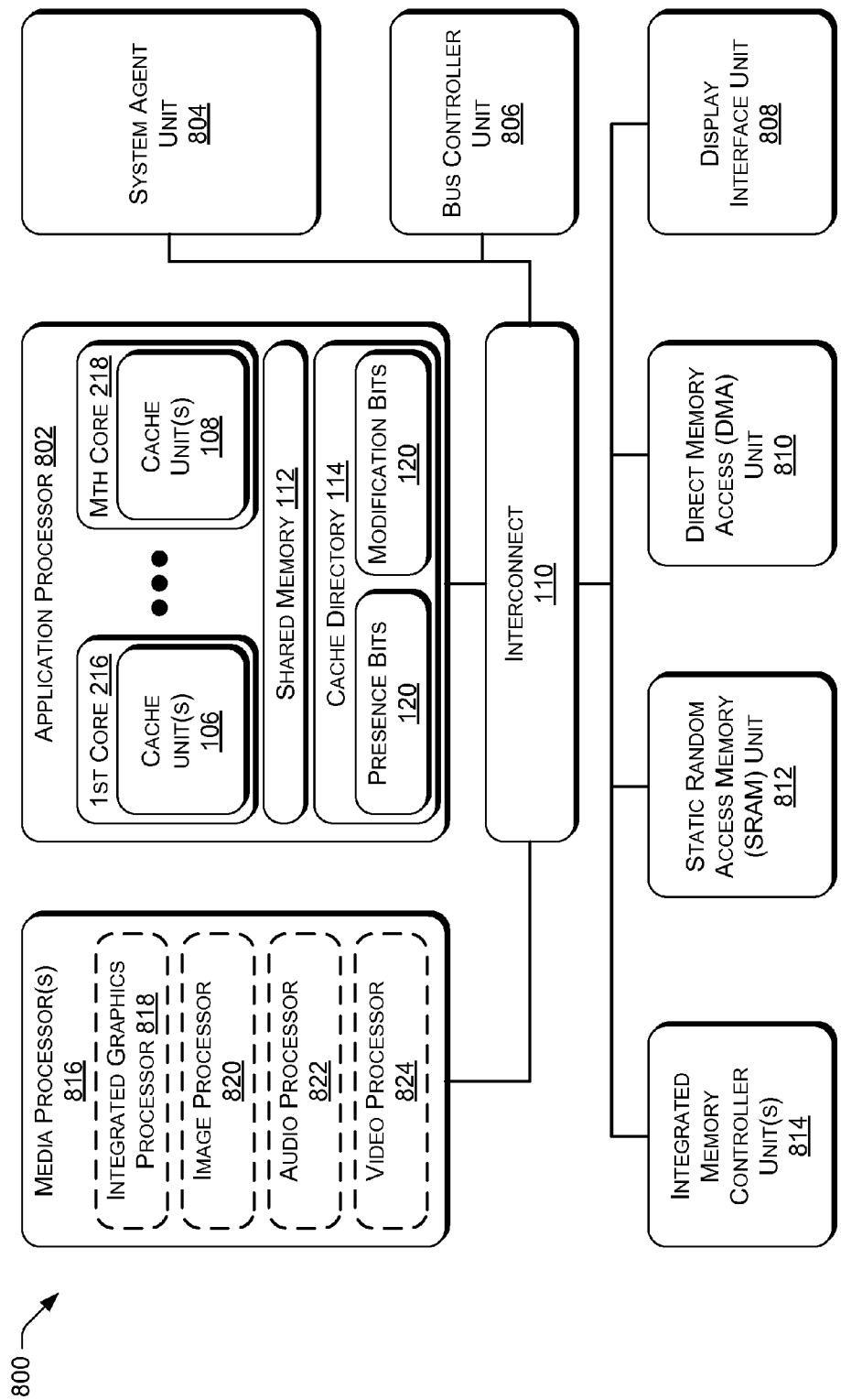
FIG. 8 illustrates a block diagram of a system on a chip in accordance with an illustrative embodiment.

FIG. 8 illustrates a block diagram of a system on a chip (SoC) 800 in accordance with an illustrative embodiment. Similar elements in FIG. 1 bear like reference numerals. Also, dashed lined boxes are optional features on more advanced SoCs. The SoC 800 includes an application processor 802, a system agent unit 804, a bus controller unit 806, a display interface unit 808, a direct memory access (DMA) unit 810, a static random access memory (SRAM) unit 812, one or more integrated memory controller unit(s) 814, and one or more media processor(s) 816 coupled to the interconnect 110. The media processors 816 may include an integrated graphics processor 818, an image processor 820, an audio processor 822, a video processor 824, other media processors, or any combination thereof. The image processor 820 may provide functions for manipulating and processing still images, in formats such as RAW, JPEG, TIFF, and the like. The audio processor 822 may provide hardware audio acceleration, audio signal processing, audio decoding (e.g., multichannel decoding), other audio processing, or any combination thereof. The video processor 824 may accelerate video coding/decoding, such as motion picture experts group (MPEG) decoding. The display interface unit 808 may be used to output graphics and video output to one or more external display units.

Figure 9:
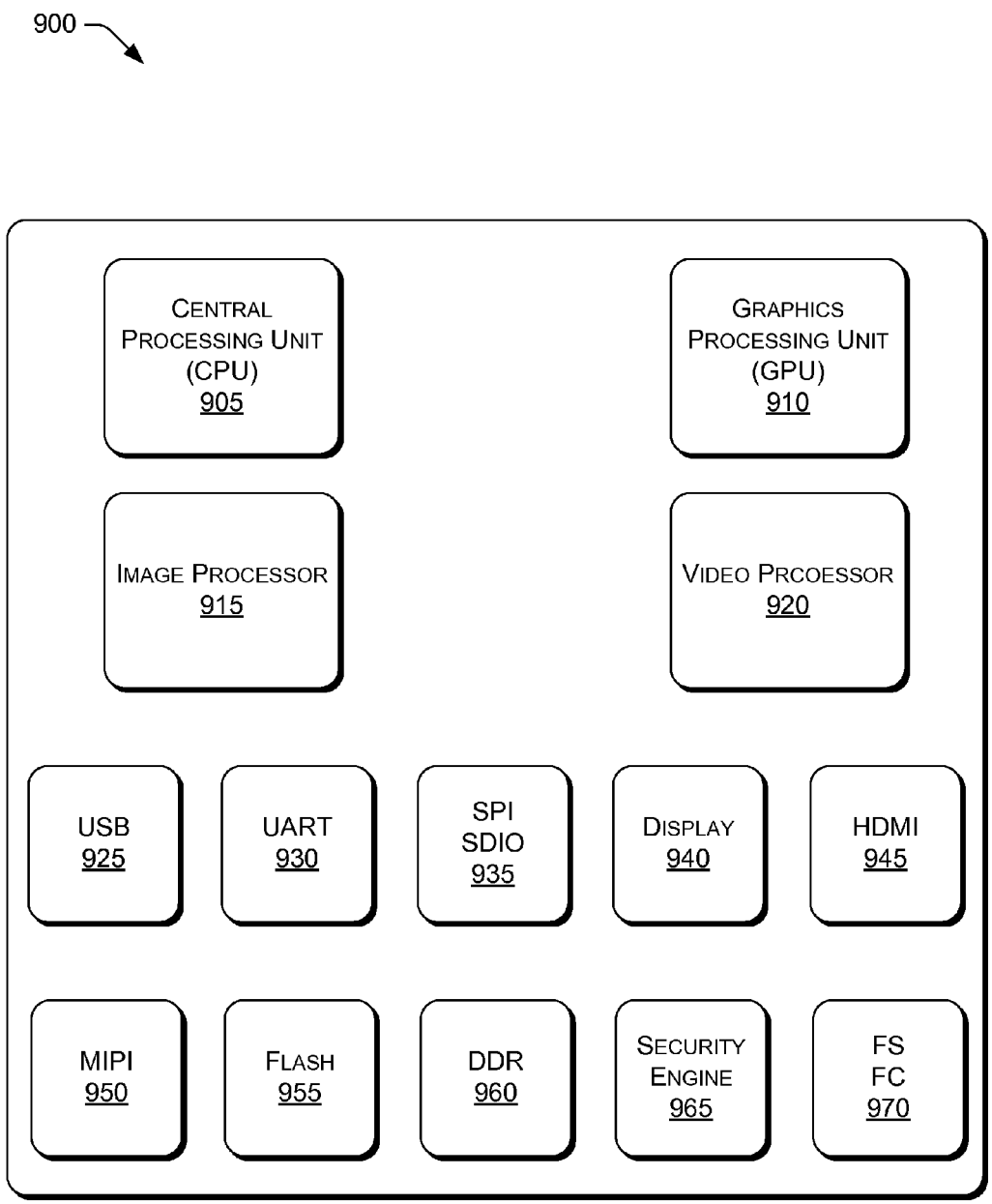
FIG. 9 illustrates a processor that includes a central processing unit and a graphics processing unit, according to an illustrative embodiment.

FIG. 9 illustrates a processor 900 that includes a central processing unit (CPU) 905 and a graphics processing unit (GPU) 910, according to an illustrative embodiment. One or more instructions may be executed by the CPU 905, the GPU 910, or a combination of both. For example, in one embodiment, one or more instructions may be received and decoded for execution on the GPU 910. However, one or more operations within the decoded instruction may be performed by the CPU 905 and the result returned to the GPU 910 for final retirement of the instruction. Conversely, in some embodiments, the CPU 905 may act as the primary processor and the GPU 910 as the co-processor.

In some embodiments, instructions that benefit from highly parallel, throughput processors may be performed by the GPU 910, while instructions that benefit from the performance of processors that benefit from deeply pipelined architectures may be performed by the CPU 905. For example, graphics, scientific applications, financial applications and other parallel workloads may benefit from the performance of the GPU 910 and be executed accordingly, whereas more sequential applications, such as operating system kernel or application code may be better suited for the CPU 905.

In FIG. 9, the processor 900 includes the CPU 905, the GPU 910, image processor 915, video processor 920, USB controller 925, UART controller 930, SPI/SDIO controller 935, display device 940, memory interface controller 945, MIPI controller 950, flash memory controller 955, dual data rate (DDR) controller 960, security engine 965, and 12S/12C controller 970. Other logic and circuits may be included in the processor of FIG. 9, including more CPUs or GPUs and other peripheral interface controllers.

One or more aspects of at least one embodiment may be implemented by representative data stored on a machine-readable medium which represents various logic within the processor, which when read by a machine causes the machine to fabricate logic to perform the techniques described herein. Such representations, known as "IP cores" may be stored on a tangible, machine readable medium ("tape") and supplied to various customers or manufacturing facilities to load into the fabrication machines that actually make the logic or processor.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

CONCLUSION

Although the subject matter has been described in language specific to structural features and/or methodological acts, the subject matter defined in the appended claims is not limited to the specific features or acts described above. Rather, the specific features and acts described above are disclosed as example forms of implementing the claims. This disclosure is intended to cover any and all adaptations or variations of the disclosed implementations, and the following claims should not be construed to be limited to the specific implementations disclosed in the specification. Instead, the scope of this document is to be determined entirely by the following claims, along with the full range of equivalents to which such claims are entitled.

What is claimed is:

1. A processor comprising:
a plurality of cores including a first core and a second core;
a cache directory to store information indicating whether particular data is stored in one or more caches that are shared by the plurality of cores, the cache directory to include a directory entry structure associated with an entry in the cache directory, the directory entry structure to include a first field to indicate when the first core has copied the particular data to modify the particular data in a cache local to the first core and a second field to indicate whether a copy of the particular data in a shared memory has been modified.

2. The processor as recited in claim 1, the first core to:
initiate a read of the particular data from a first cache that is accessible to the first core;
in response to detecting an error associated with the read, identify a location in the processor that includes the particular data, the location one of the shared memory, a main memory, or a second cache; and
copy the particular data from the location.

3. The processor as recited in claim 1, the first core to:
  initiate a read operation of the particular data from a cache that is accessible to the first core; in response to detecting that a read miss occurred, determine whether the first field is set;
  in response to determining that the first field is set, determine that the second core has a copy of the particular data based on a presence bit in the cache directory that is associated with the second core;
  send a request to the second core to write the copy of the particular data to the shared memory; and
  read the copy of the particular data from the shared memory.

4. The processor as recited in claim 3, the first core to:
  unset the first field; and
  set the second field.

5. The processor as recited in claim 1, the first core to:
  initiate a write of the particular data to a cache accessible to the first core;
  in response to detecting that a write miss occurred, determine whether the first field is set;
  in response to determining that the first field is not set, set the first field;
  read the particular data from a main memory;
  modify the particular data to create modified data; and
  write the modified data to the cache.

6. The processor as recited in claim 5, the first core to:
  in response to determining that the first field is set, obtain a copy of the particular data that is included in a second cache associated with the second core;
  modify the copy of the particular data to create modified data; and
  write the modified data to the cache that is accessible to the first core.

7. The processor as recited in claim 6, the first core to:
  unset the first field; and
  set the second field.

8. A system that includes a plurality of processors, at least one of the plurality of processors comprising:
  a cache directory to store information indicating whether particular data is stored in at least one cache that is shared by the plurality of processors, the cache directory to include a directory entry structure associated with an entry in the cache directory, the directory entry structure to include a first field to indicate when a first processor of the plurality of processors has copied the particular data to modify the particular data in a cache local to the first processor and a second field to indicate whether a copy of the particular data in a shared memory has been modified but not written to a main memory.

9. The system as recited in claim 8, the first processor to:
  initiate a read operation of the particular data from a cache accessible to the first processor;
  in response to detecting that a read miss occurred, determine whether the first field is set;
  in response to determining that the first field is set, determine that a second processor has a copy of the particular data;
  read a copy of the particular data from a shared memory that is accessible to both the first processor and the second processor;
  unset the first field; and
  set the second field.

10. The system as recited in claim 8, the first processor to:
  initiate a write of the particular data to a cache accessible to the first processor;
  in response to detecting that a write miss occurred, determine whether the first field is set;
  in response to determining that the first field is not set, set the first field;
  read the particular data from a main memory;
  modify the particular data to create modified data; and
  write the modified data to the cache.

11. The system as recited in claim 10, the first processor to:
  in response to determining that the first field is set, obtain a copy of the particular data that is included in a second cache associated with a second processor;
  modify the copy of the particular data to create modified data;
  write the modified data to the cache that is accessible to the first processor;
  unset the first field; and
  set the second field.

12. The system as recited in claim 8, the first processor to:
  in response to determining that the first field is set, performing a writeback that includes writing the particular data to a shared memory;
  setting the second field associated with the particular data;
  unsetting the first field associated with the particular data; and
  initiating eviction of the particular data from a level-one cache that is associated with the first processor.

13. The system as recited in claim 8, the first processor to:
  in response to determining that the second field is set, determine whether other caches associated with other processors of the plurality of processors include a copy of the particular data;
  in response to determining that the other caches exclude the copy of the particular data;
  initiate a writeback of the particular data, the writeback including writing the particular data to a main memory;
  unset the second field; and
  evict the particular data from a level-two cache that is associated with the processor.

14. A method comprising:
  maintaining a cache directory to store information indicating whether particular data is stored in one or more caches that are shared by a plurality of cores, the cache directory including a directory entry structure associated with an entry in the cache directory, the directory entry structure including a first field to indicate when the first core has copied the particular data to modify the particular data in a cache local to the first core and a second field to indicate whether a copy of the particular data in a shared memory has been modified;
  initiating, by a first core of a processor, a read operation of particular data from a first cache that is accessible to the first core;
  in response to detecting an error associated with the read operation, identifying a location in the processor that includes the particular data; and
  copying the particular data from the location to the first cache.

15. The method as recited in claim 14, wherein the location that includes the particular data is one of a shared memory accessible to the first core, a cache of another core, a cache of another processor, or a main memory.

16. The method as recited in claim 14, further comprising:
  in response to detecting that a read miss occurred, determining whether the first field of a directory entry structure is set, the first field to indicate that the first core has a copy of the particular data;

in response to determining that the first field is set, determine that a second core of the processor has a copy of the particular data;
obtaining the copy of the particular data from a shared memory location that is accessible to both the first core and the second core;
unsetting the first field; and
setting the second field, the second field to indicate that the first core and the second core have a copy of the particular data.

17. The method as recited in claim 14, further comprising:
initiating, by the first core, a write of the particular data to a cache accessible to the first core;
in response to detecting that a write miss occurred, determine whether the first field is set;
in response to determining that the first field is not set, setting the first field;
reading the particular data from a main memory;
modifying the particular data to create modified data; and
writing the modified data to the cache.

18. The method as recited in claim 17, further comprising:
in response to determining that the first field is set, obtaining a copy of the particular data that is included in a second cache associated with the second core;
modifying the copy of the particular data to create modified data;
writing the modified data to the cache that is accessible to the first core;
unsetting the first field; and
setting the second field.

19. The method as recited in claim 14, further comprising:
in response to determining that the first field is set, performing a writeback of the particular data, the writeback including writing the particular data to a shared memory that is accessible to both the first core and the second core;
setting the second field associated with the particular data;
unsetting the first field associated with the particular data; and
initiating eviction of the particular data from a level-one cache that is associated with the first core.

20. The method as recited in claim 14, further comprising:
in response to determining that the second field is set, determining whether other caches associated with other cores of the plurality of cores include a copy of the particular data;
in response to determining that the other caches exclude the copy of the particular data;
initiating a writeback of the particular data, the writeback including writing the particular data to a main memory;
unsetting the second field; and
initiating eviction of the particular data from a level-two cache that is accessible to the first core.

21. The method as recited in claim 20, further comprising:
in response to determining that the second field is not set, initiating eviction of the particular data from a level-two cache that is accessible to the first core.

22. The method as recited in claim 14, further comprising:
in response to determining that the second field is not set, initiating eviction of the particular data from a shared memory.

23. The method as recited in claim 22, further comprising:
in response to determining that the second field is set, unsetting the second field; and
initiating eviction of the particular data from the shared memory.

* * * * *